United States Patent [19]

Hawkins

[11] 4,012,048
[45] Mar. 15, 1977

[54] ACOUSTIC DAMPING TURNTABLE AND ADAPTER

[75] Inventor: William R. Hawkins, Panorama City, Calif.

[73] Assignee: Newcomb Audio Products Co., Sylmar, Calif.

[22] Filed: May 2, 1975

[21] Appl. No.: 574,047

[52] U.S. Cl. .............................................. 274/39 R
[51] Int. Cl.² .......................................... G11B 3/60
[58] Field of Search ............ 274/39 A, 39 R, 10 S, 274/9 A

[56] References Cited

UNITED STATES PATENTS

| | | | |
|---|---|---|---|
| 778,492 | 12/1904 | Johnson | 274/39 R |
| 1,877,707 | 9/1932 | Weil | 274/39 A |
| 2,236,275 | 3/1941 | Rich | 274/9 A |
| 3,034,795 | 5/1962 | Guest | 274/39 R |
| 3,220,735 | 11/1965 | Beugin | 274/9 A |

FOREIGN PATENTS OR APPLICATIONS 1,215,253  11/1959  France ............................... 274/9 A Primary Examiner—Steven L. Stephan
Attorney, Agent, or Firm—Flam & Flam

[57] ABSTRACT

Concentric rings of acoustic damping material are mounted on a turntable surface and combine with an insulating adapter to provide acoustic isolation for records with large or small spindle holes. The rings are unconnected to prevent acoustic coupling between the rings while providing a flat surface on which a recording disc may be mounted. The adapter is formed of acoustic damping material and is resiliently mounted in the center of the turntable to be received by two different size spindle holes of various recording discs. The adapter is in the form of a disc having a thin annular section adapted to be received in a large spindle hole and an upstanding cylindrical section or boss of smaller diameter adapted to be received in a small spindle hole. The adapter is resiliently extended to normally position the annular section in the same plane as a recording disc mounted on the concentric rings. When a disc with a small spindle hole is placed on the concentric rings, its weight will bear upon the annular section of the adapter to reposition the adapter so that the boss is positioned in the plane of the recording disc to be received in the small spindle hole.

1 Claim, 2 Drawing Figures

ACOUSTIC DAMPING TURNTABLE AND ADAPTER

BACKGROUND OF THE INVENTION

1. Field of the Invention

The present invention relates to sound recording turntable surfaces and size adapters therefor.

2. Description of the Prior Art

In quality sound systems, the most noticeable and distracting noises are often those generated by the components of the turntable. Previous turntables have employed a rigid rubber surface for mounting recording discs. Such surfaces readily transmit noise and vibrations to the recording disc from the drive mechanism and other components connected to the turntable. In addition, a steel shaft or spindle normally extends from the center of the turntable to position the recording discs. This rigid metal shaft also acts to transmit noises and impart vibration to the recording discs. Where adapters are employed, such as to allow the normal turntable to play records with different size spindle holes, the adapters are normally composed of a hard plastic or the like and are rigidly connected to the central metal shaft so that vibrations of the metal shaft are transmitted directly through the adapter to the recording discs.

SUMMARY OF THE INVENTION

The turntable of this invention includes a drive shaft adapted to rotate a turntable disc and first acoustic damping means mounted in the turntable disc to provide a substantially flat surface for mounting a recording disc spaced from the turntable disc. The first damping means comprises a plurality of concentric rings and means for at least partially acoustically decoupling adjacent rings.

In one embodiment of the invention, a spindle pin protrudes from the central portion of the turntable to be received in the spindle hole of the recording disc. Second acoustic damping means are provided to be positioned between the spindle pin and the spindle hole in order to acoustically isolate the recording disc from the turntable drive shaft.

In another embodiment of the invention the first acoustic damping means comprises a plurality of unconnected concentric foam rubber rings to acoustically couple adjacent rings. The second acoustic damping means comprises a thin circular cylindrical sleeve slidably and rotatably mounted on the pin and a soft rubber adapter having an upstanding central cylindrical boss surrounding the sleeve and an annular section. The annular section of the adapter may be received into a large size spindle hole of a recording disc while the upstanding cylindrical boss may be received into a small size spindle hole of a recording disc. The adapter is resiliently extended on the pin to a position where the periphery of the annular section is normally positioned in the plane of a recording disc mounted on the record bearing surface of the concentric rings. The adapter also is resiliently reciprocated by the weight of a recording disc having a large size spindle hole to a position where the boss is positioned in the plane of such a recording disc mounted on the cylindrical rings so that the boss will be received in the small size spindle hole.

BRIEF DESCRIPTION OF THE DRAWINGS

In the drawing which constitutes part of the specification, exemplary embodiments demonstrating the various features of this invention are set forth wherein.

DESCRIPTION OF THE PREFERRED EMBODIMENTS

The turntable of this invention employs a plurality of unconnected concentric rings to separate the recording disc from the turntable disc. These rings, composed of an acoustic damping material such as foam rubber, are not connected to each other in order to acoustically decouple the rings. In addition, a spring loaded adapter, composed of an acoustic damping material such as soft rubber or the like, is mounted on the central turntable shaft to center various size recording discs, such as 45 rpm records and 33⅓ records. The adapter has a large diameter annular section which snugly fits into the spindle hole or central aperture of 45 rpm records. When a 33⅓ rpm record is employed, the record spindle hole or central aperture snugly fits around the periphery of the upstanding central cylindrical section or boss of the adapter and the weight of the record bears upon the annular section adapter to depress the adapter to a position where the record rests upon the concentric rings. In this manner, the recording discs are acoustically isolated from vibrations in both the turntable disc and the turntable shaft.

Figure 1:
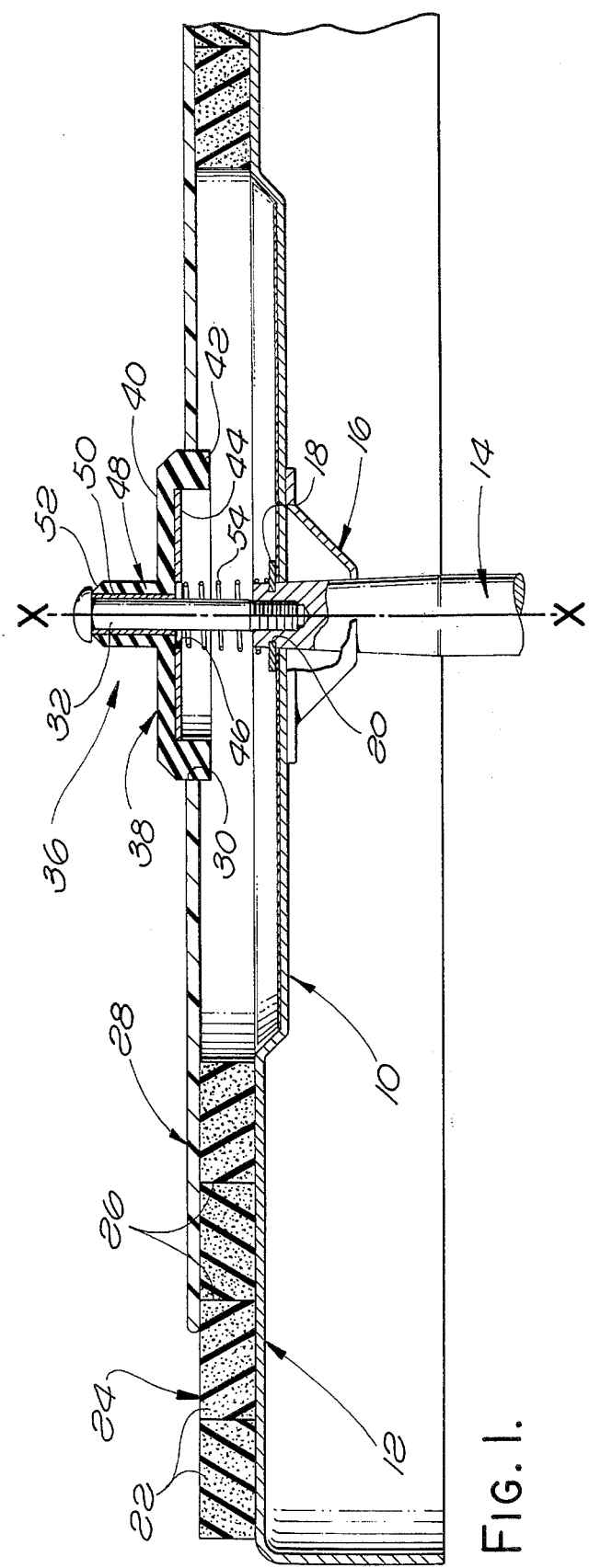
FIG. 1 is a fragmentary, partially cross-sectional, elevational view of one embodiment of this invention as employed with a first type of recording disc.
Figure 2:
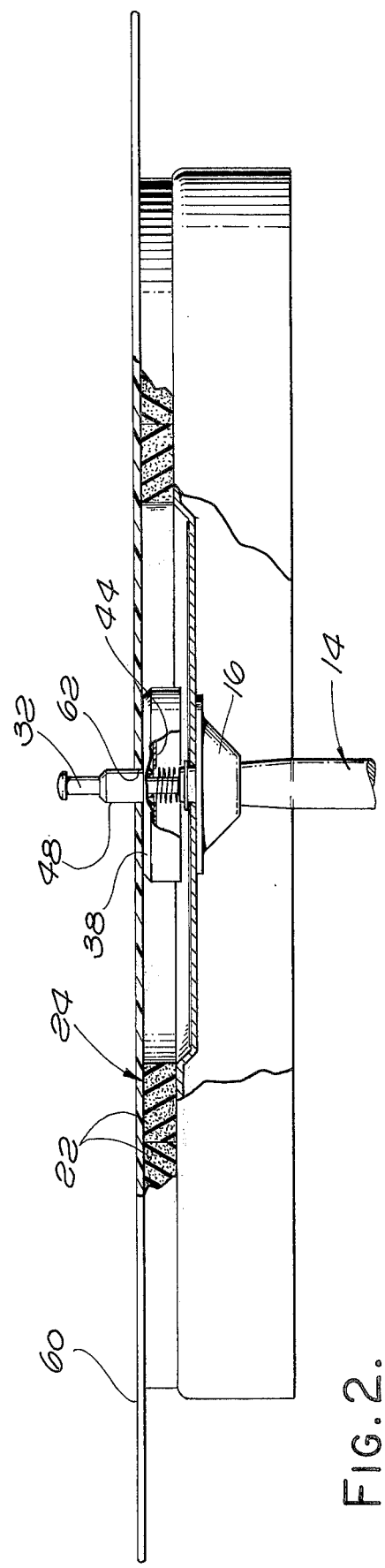
FIG. 2 is a partially cross-sectional, elevational view of the embodiment of the invention shown in FIG. 1 employed with a second type of record disc.

More specifically, in the embodiment of the invention shown in FIGS. 1 and 2, a turntable disc 10 provides a raised, substantially flat annular portion 12. A central turntable drive shaft 14, having a longitudinal axis X—X extending perpendicular to the plane of the turntable annular portion 12, transmits power from a motor (not shown) to drive the turntable disc 10. The turntable disc 10 is securely mounted on the shaft 14 by means of bell-shaped support member 16 which is secured to both the shaft and to the turntable disc by winding or the like. Retaining ring 18, which may be a snap ring or the like, is positioned in annular slot 20 at the top of the shaft 14 to bear against the central portion of the turntable disc on the side opposite the support member 16 in order to clamp the turntable disc securely in position.

A plurality of concentric rings 22, composed of an acoustic damping material, are mounted on the turntable annular surface 12 to provide a substantially flat recording disc receiving surface 24 in a plane perpendicular to the longitudinal axis X—X of the drive shaft 14. In this embodiment of the invention four such concentric rings are secured to the annular surface 12 with adhesive glue or the like. The rings extend in a radial direction from about 2 inches to about 4.5 inches from the longitudinal axis X—X of the drive shaft. In this embodiment of the invention, each ring is composed of a foam rubber material which is about one-half inch wide and one-quarter inch high. Each ring is discrete and unconnected to adjacent rings, at least at the record bearing surface 24 thereof, in order to void acoustic coupling between the rings. In this embodiment of the invention, slots 26 are cut between adjacent rings from the record bearing surface 24 to the annular portion 12 in order to insure discrete rings. one piece of foam rubber having circular slots cut through the piece may be employed, for example, to form the adjacent discrete rings 22. The recording disc 28 is thus supported spaced from the turntable disc 10 and in a plane perpendicular to the longitudinal axis X—X of the drive shaft 14 to substantially eliminate the transmission of vibrations from the turntable disc to the recording disc. A primary function of the adapter 36 is to provide acoustical isolation between the turntable drive shaft 14 and the recording disc 28. In addition, the particular design of adapter shown in FIGS. 1 and 2 allows recording discs having two different size central apertures or spindle holes to be rotated on this particular turntable. For example, FIG. 1 shows a 45 rpm recording disc 28 having a large spindle hole 30 while FIG. 2 shows a 33⅓ rpm recording disc 60 having a relatively smaller spindle hole 62. A spindle pin or post 32 is secured to the drive shaft 14 with the longitudinal axis of the pin 32 coincident with the longitudinal axis X—X of the drive shaft 14. In this embodiment of the invention, the pin 32 is screwed into the top of the shaft 14. The pin 32 terminates at its end remote from the drive shaft in an enlarged head 34 designed to retain the adapter 36 on the post against the bias of spring 54, as will be explained hereinafter.

Adapter 36 has a thin annular cup-shaped section 38 and an upstanding axially central circular cylindrical section or boss 48 integrally molded together and formed of an acoustic damping material, such as soft butyl rubber or the like. Encased within the central cylindrical section 48, and secured thereto by glue or the like, is a bearing sleeve 50, composed of a metal such as stainless steel or the like, which provides a rotatable and slidable bearing surface between the adapter 36 and the post 32. The shoulders 52 of the boss are rounded in order to provide for easy positioning of the disc spindle holes over the adapter.

The cup-shaped annular adapter section 38 includes a circular skirt 40 formed integrally with the upstanding boss 48 and an annular flange 42 depending from the periphery of the skirt 40. A support plate 44, such as a metal washer or the like, having a central aperture 46, is secured inside the depending flange 42 to the skirt 44 to provide the strength necessary to support the desired configuration of the adapter. The pin 32 passes through the central aperture 46 of the support plate 44.

Conical compression spring 54 surrounds the pin 32 between the shaft 14 and the adapter support plate 44 to normally bias the adapter to an extended position limited by the adapter shoulder 52 and sleeve 50 bearing against the spindle pin head 34. In this normally extended position, the adapter is designed to receive the relatively large spindle hole 30 of recording discs, such as of 45 rpm records. The head 34 of pin 32 is positioned at an appropriate height above the recording disc bearing surface 24 to insure that the depending adapter flange 42 will be in position to be received by the recording disc spindle hole 30 when the adapter is extended to bear against the post head 34. In this embodiment of the invention, the lower surface of the pin head 34 is spaced approximately 0.5 inches above the plane of the record bearing surface 24. The adapter is constructed so that when the shoulder 52 and sleeve 50 are extended to ride against the lower surface of the head 34, the exterior of the peripherally depending flange 42 extends above and below the plane of the disc bearing surface 24 an amount sufficient to provide contact between the flange and a properly positioned recording disc. When such recording discs are thus properly positioned on the record bearing surface 24 of the turntable of this invention, a portion of the recording disc will be supported by the bearing surface 24 of the concentric rings while the exterior of the peripherally depending adapter flange 42 fits snugly within the spindle hole 30, as shown in FIG. 1.

FIG. 2 shows the operation of this embodiment of the invention employed with recording disc 60 having a smaller diameter spindle hole 62, such as a 33⅓ rpm record. The strength of the spring 44 is selected so that the weight of the recording disc 60 positioned on the concentric rings 22 is sufficient to compress the spring to a point where the top of the adapter annular section 38 is positioned in the plane of the record bearing surface 24. As is shown in FIG. 2, such a recording disc 60 will be borne partially upon the recording disc bearing surface 24 while the central aperture 62 will fit snugly around the periphery of the adapter upstanding cylindrical boss 48.

A turntable is thus provided which acoustically isolates the recording disc mounted thereon from vibrations transmitted through both the turntable disc and the centering spindle post. The scope of this invention is not, however, limited to the specific embodiments described herein. For example, various dimensions and materials may be changed, all within the scope of the claims.

What is claimed is:
1. In a turntable for recording discs:
   a. a turntable having a record bearing surface thereon;
   b. means supporting said turntable for rotation about its axis;
   c. a spindle pin carried by the turntable extending axially upwardly of the bearing surface for centering recording discs on said turntable;
   d. a sleeve guidingly mounted on said spindle pin for slidable movement thereon;
   e. means determining an upward limit to the movement of said sleeve;
   f. spring means carried by the turntable for urging said sleeve towards its said upper limit;
   g. a composite integral adapter ring of acoustic damping material and secured to said sleeve for mounting thereby and movement as a unit therewith, said adapter ring having an upper small diameter part and a lower large diameter part adapted respectively to engage the spindle holes of larger and smaller diameter recording discs;
   h. said composite adapter ring also having a substantially flat pad part at the base of said small diameter part and extending to the top of said large diameter part;
   i. means forming a recess in said turntable for receiving said adapter ring with said pad part coplanar with said bearing surface when said pad part is engaged by a recording disc with a smaller spindle hole;
   j. said spring yielding upon application of the weight of said smaller spindle hole recording disc;
   k. the coupling between said spindle pin and said recording discs for centering thereof being dependent upon the acoustic camping material of said adapter ring;

1. said record bearing surface comprising a pad of foam rubber-like acoustic damping material, said pad having a plurality of surface separated contiguous interfitted annular sections, the innermost annular section forming at least the upper part of said turntable recess, acoustic vibrations from the turntable to a recording disc mounted on said bearing surface being dependent for their transmission either upon said pad or said composite adapter ring.

* * * * *